(12) United States Patent
Kwon et al.

(10) Patent No.: US 9,711,246 B2
(45) Date of Patent: Jul. 18, 2017

(54) PASSIVE CONTAINMENT AIR COOLING DEVICE AND SYSTEM WITH ISOLATED PRESSURE BOUNDARY

(71) Applicant: KOREA ATOMIC ENERGY RESEARCH INSTITUTE, Daejeon (KR)

(72) Inventors: Tae-Soon Kwon, Daejeon (KR); Kihwan Kim, Daejeon (KR); Hyun Sik Park, Daejeon (KR); Yusun Park, Daejeon (KR); Sung Won Bae, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 418 days.

(21) Appl. No.: 14/460,806

(22) Filed: Aug. 15, 2014

(65) Prior Publication Data

US 2015/0243382 A1     Aug. 27, 2015

(30) Foreign Application Priority Data

Feb. 27, 2014   (KR) .......................... 10-2014-0023606

(51) Int. Cl.

| G21C 15/00 | (2006.01) |
|---|---|
| G21C 9/012 | (2006.01) |
| G21C 13/02 | (2006.01) |
| G21C 15/253 | (2006.01) |
| G21C 15/26 | (2006.01) |

(52) U.S. Cl.
CPC ............. *G21C 15/00* (2013.01); *G21C 9/012* (2013.01); *G21C 13/02* (2013.01); *G21C 15/253* (2013.01); *G21C 15/26* (2013.01); *Y02E 30/40* (2013.01)

(58) Field of Classification Search
CPC .......... G21C 9/00; G21C 9/004; G21C 9/012; G21C 13/02; G21C 13/022; G21C 15/18; G21C 15/182; G21C 15/253; G21C 15/26
See application file for complete search history.

(56) References Cited

U.S. PATENT DOCUMENTS

| 5,112,569 A * | 5/1992 | Cinotti ................... G21C 1/322 |
|---|---|---|
| | | 376/282 |
| 5,612,982 A * | 3/1997 | Woodcock ............. G21C 15/18 |
| | | 376/298 |
| 2013/0272475 A1* | 10/2013 | Vereb ..................... G21C 15/18 |
| | | 376/299 |

FOREIGN PATENT DOCUMENTS

| KR | 10-0594840 B1 | 6/2006 |
|---|---|---|
| KR | 1020090003960 A | 1/2009 |
| KR | 101224024 B1 | 1/2013 |
| KR | 101242746 B1 | 3/2013 |

* cited by examiner

*Primary Examiner* — Jack W Keith
*Assistant Examiner* — Sharon M Davis
(74) *Attorney, Agent, or Firm* — Maier & Maier, PLLC

(57) ABSTRACT

Provided is a passive containment air cooling device with an isolated pressure boundary, including a heat exchanger positioned inside and outside a containment, penetrating through an outer wall of the containment to be connected to the containment through a pipe and thus form a closed loop, and including a coolant, an air induction duct circulating air outside the heat exchanger, and a cooled air exhaust unit formed in the air induction duct to increase cooling efficiency of the heat exchanger.

8 Claims, 7 Drawing Sheets

[fig. 1]
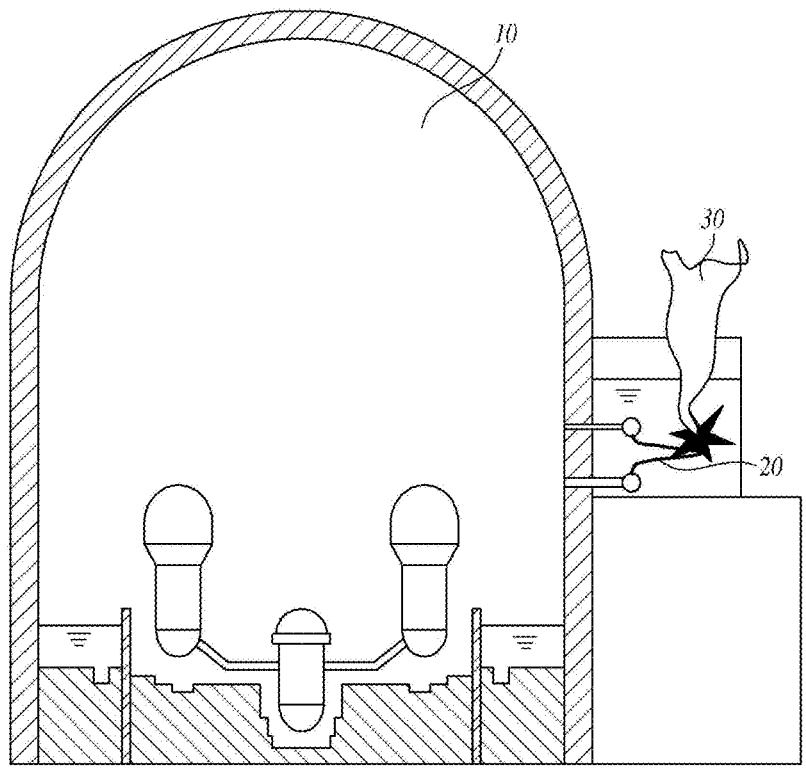
PRIOR ART

[fig. 2]
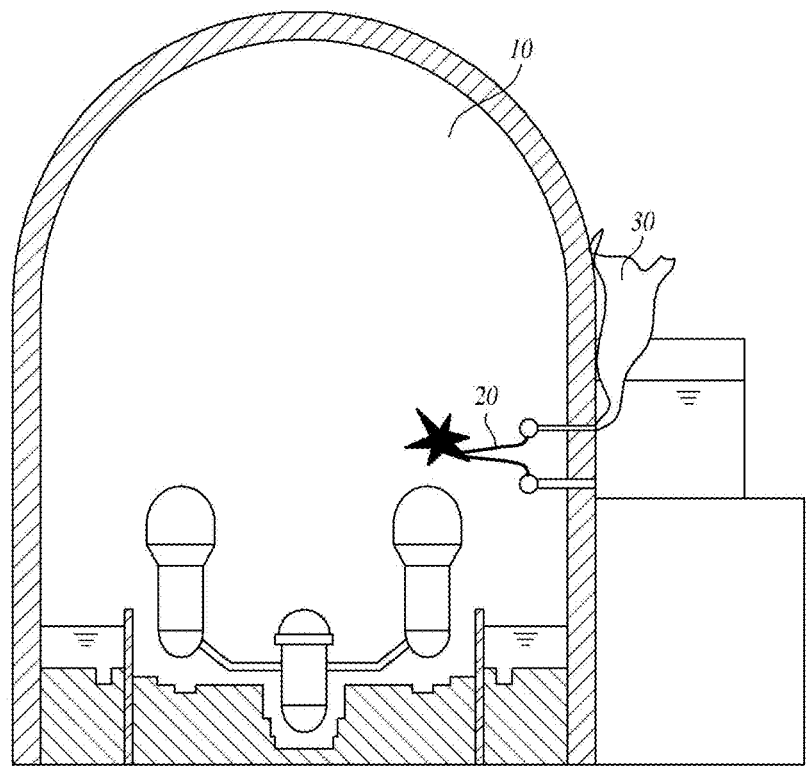
PRIOR ART

[fig. 3]
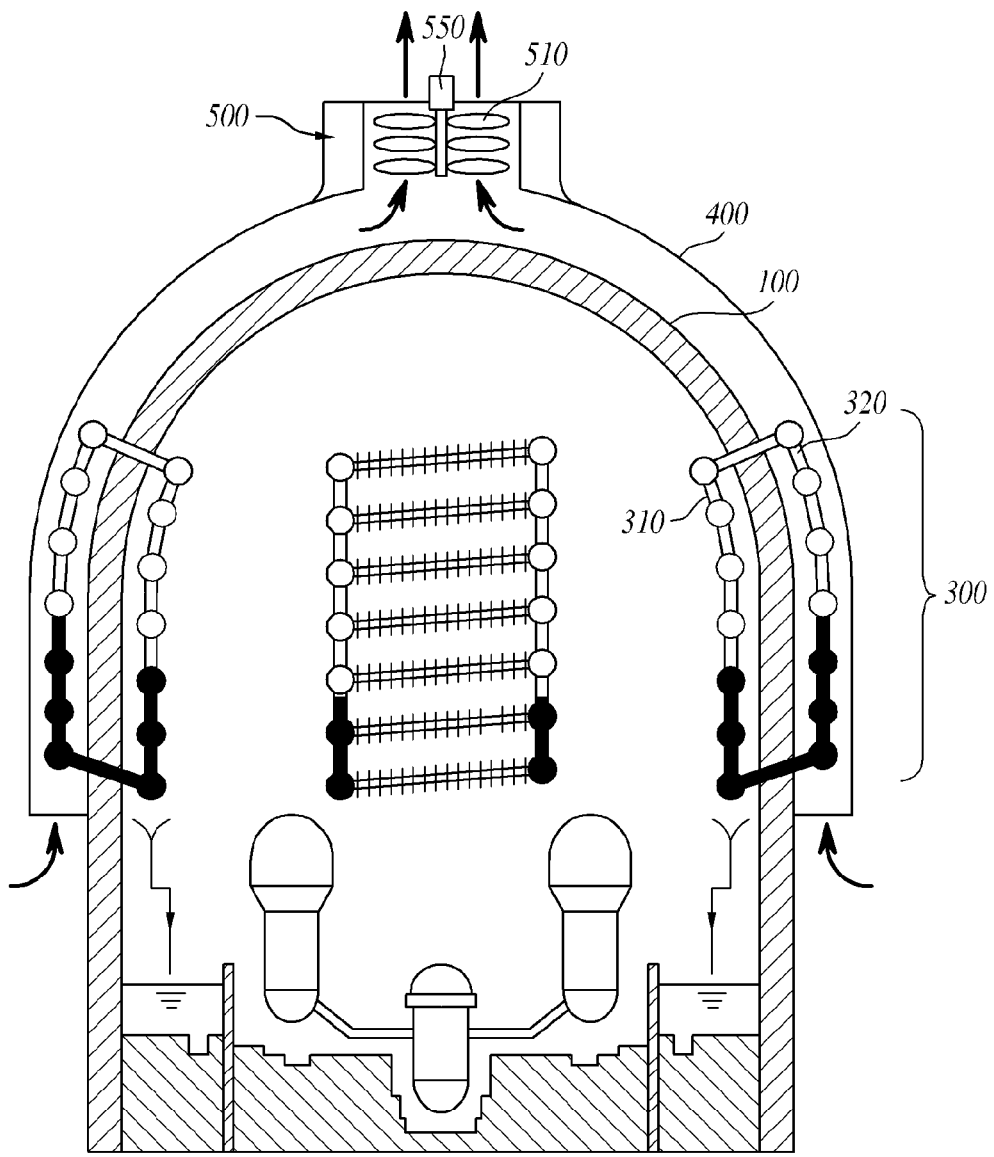

[fig. 4]
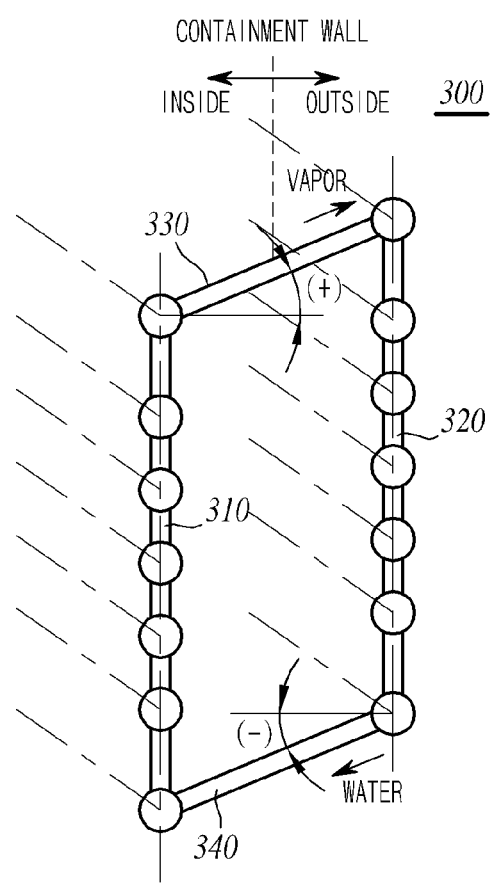

[fig. 5]
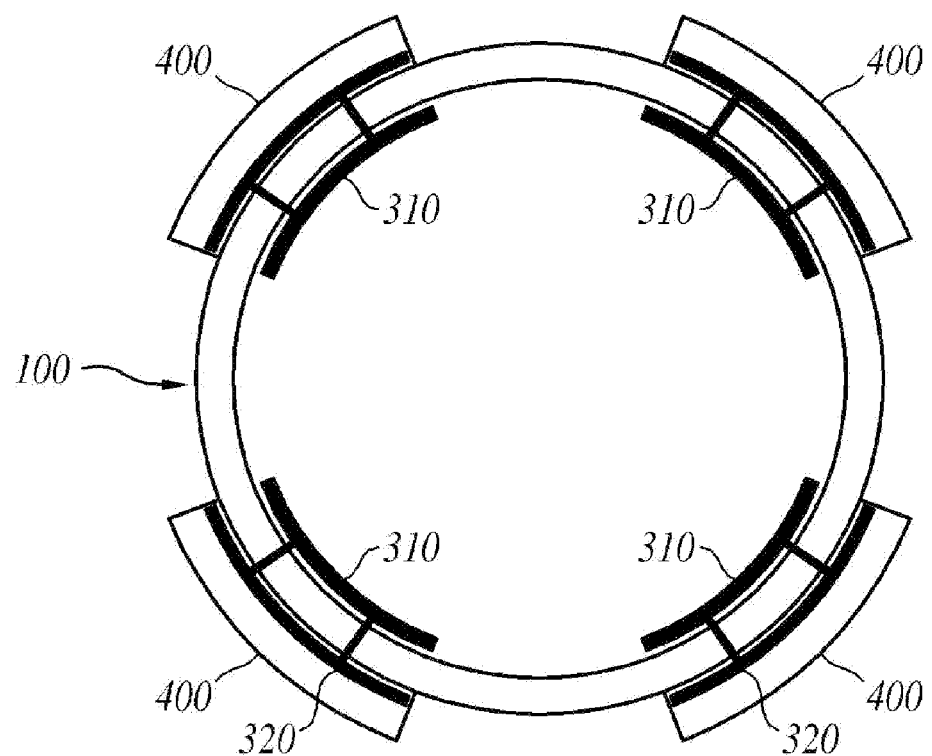

[fig. 6]
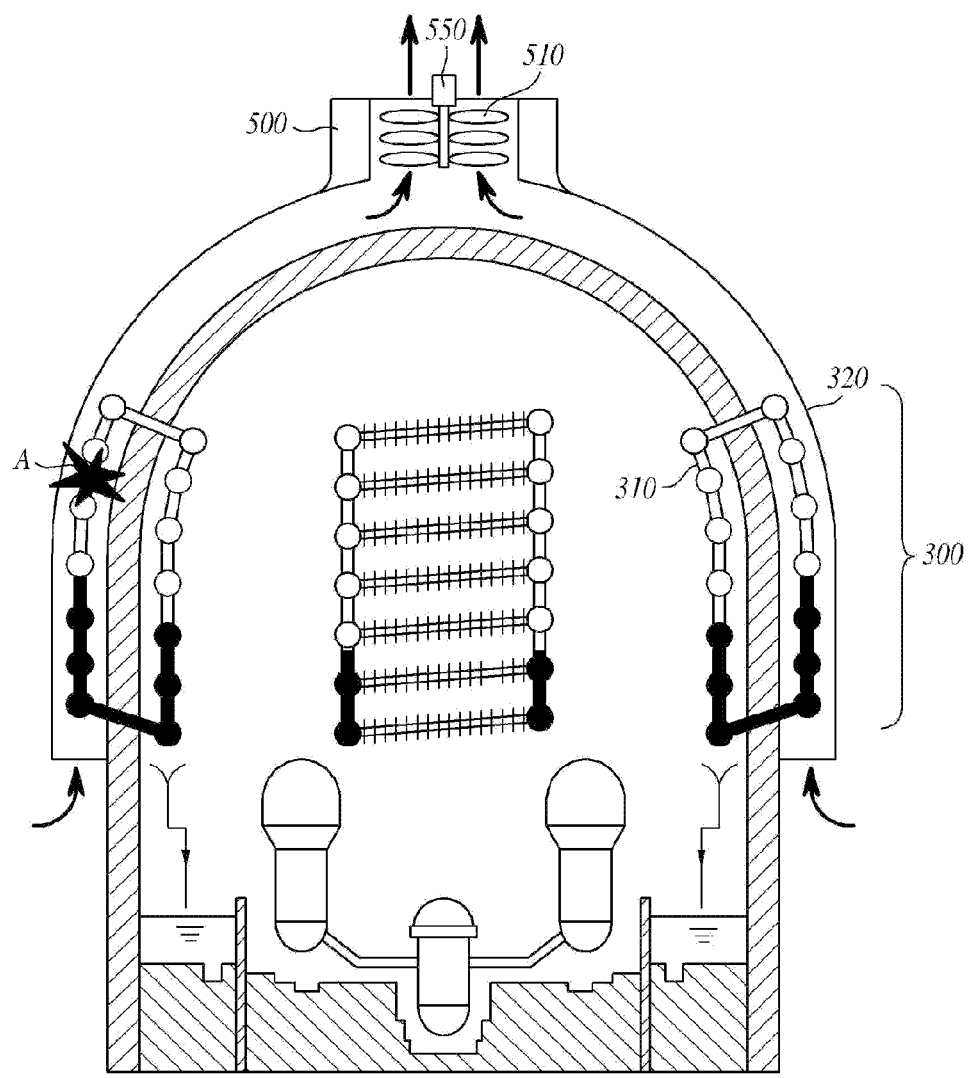

[fig. 7]
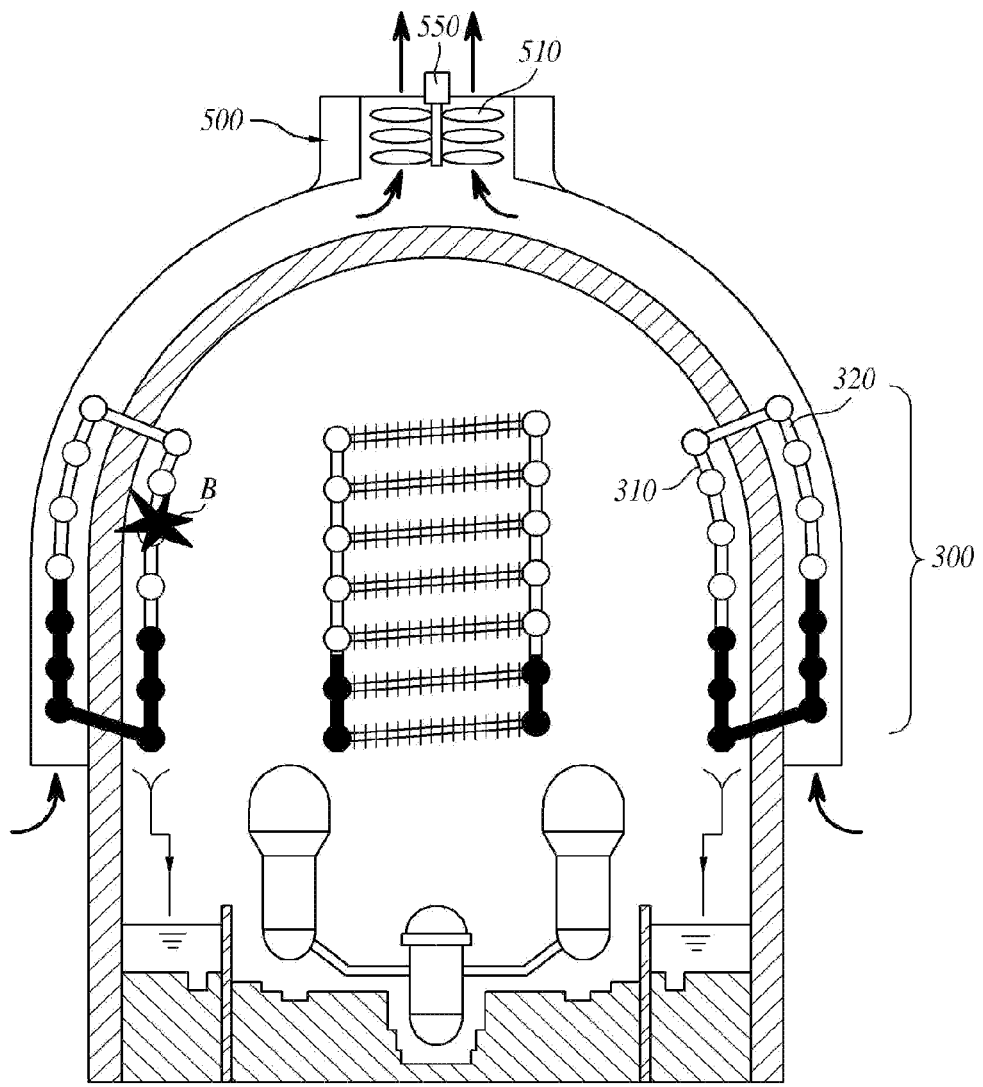

PASSIVE CONTAINMENT AIR COOLING DEVICE AND SYSTEM WITH ISOLATED PRESSURE BOUNDARY

BACKGROUND OF THE INVENTION

1. Field of the Invention

The present invention relates to a passive containment air cooling device and system with an isolated pressure boundary, and more particularly, to a passive containment air cooling device and system with an isolated pressure boundary, in which a radioactive substance in a containment is prevented from being discharged out of the containment even though an internal or external part is broken.

2. Description of the Related Art

When a leakage accident of cooling water occurs in a nuclear power plant, the cooling water is confined in a containment to manage the accident, and an internal part of the containment is cooled in order to prevent the internal pressure of the containment from being increased.

In a light water reactor, generally, when the internal pressure of the containment is increased after a nuclear reactor accident, a vapor in the containment is condensed by using a spray pump, or a large-sized water tank is provided outside the containment and a heat exchanger is provided in the containment to condense a vapor in the heat exchanger and thus reduce the pressure of the containment. Referring to FIGS. 1 and 2, in a typical containment cooling system, when a portion of a heat exchanger 20 positioned inside or outside a containment 10 is broken, a radioactive substance 30 in the containment 10 may be discharged through the broken heat exchanger 20 into the atmosphere.

This type is used in most of containment cooling systems, and an example thereof includes Korean Patent No. 10-1224024.

In order to solve the aforementioned limitation, the present invention proposes a passive containment air cooling device with an isolated pressure boundary.

SUMMARY OF THE INVENTION

In order to achieve the objects, the present invention provides a passive containment air cooling device with an isolated pressure boundary, including: a heat exchanger positioned inside and outside a containment, penetrating through an outer wall of the containment to be connected to the containment through a pipe and thus form a closed loop, and including a coolant; an air induction duct circulating air outside the heat exchanger; and a cooled air exhaust unit formed in the air induction duct to increase cooling efficiency of the heat exchanger.

The heat exchanger may include: a containment internal heat exchanger exposed to an inside of the containment; a containment external heat exchanger exposed to an outside of the containment; a gas phase (vapor) connection pipe penetrating through the outer wall of the containment and connecting a side of an upper part of the containment internal heat exchanger and a side of an upper part of the containment external heat exchanger; and a liquid phase (water) connection pipe penetrating through the outer wall of the containment and connecting a side of a lower part of the containment internal heat exchanger and a side of a lower part of the containment external heat exchanger.

The containment internal heat exchanger, the containment external heat exchanger, the gas phase (vapor) connection pipe, and the liquid phase (water) connection pipe may constitute a closed loop.

The containment internal heat exchanger and the containment external heat exchanger may have a heat exchanger tube assembly structure enduring internal and external pressures.

The gas phase (vapor) connection pipe may be inclined at a slope of (+)5° or more to a ground surface from the inside of the containment to the outside, and the liquid phase (water) connection pipe may be inclined at a slope of (−)5° or less to the ground surface from the outside of the containment to the inside.

The containment internal heat exchanger may vaporize a coolant in the containment internal heat exchanger due to internal heat of the containment.

The containment external heat exchanger may emit heat to external air to condense a coolant in the containment external heat exchanger.

The cooled air exhaust unit may be selectively provided on any one of upper, lower, and middle portions inside the air induction duct.

The present invention also provides a passive containment air cooling system with an isolated pressure boundary, including the passive containment air cooling devices with the isolated pressure boundary according to any one of claims 1 to 8 provided on each quadrant of an outer part of one containment.

The passive containment air cooling device with the isolated pressure boundary may be respectively provided with air induction ducts, wherein the air induction ducts are converged into one in an upper part of the containment and have a single air outlet.

BRIEF DESCRIPTION OF THE DRAWINGS

The above and other objects, features and advantages of the present invention will be more clearly understood from the following detailed description taken in conjunction with the accompanying drawings, in which:

FIG. 1 is a cross-sectional view illustrating a related art containment cooling system where a passive water cooling heat exchanger is positioned outside a containment.

FIG. 2 is a cross-sectional view illustrating a related art containment cooling system where a passive water cooling heat exchanger is positioned inside a containment.

FIG. 3 is a vertical cross-sectional view illustrating a passive containment air cooling device with an isolated pressure boundary according to an embodiment of the present invention.

FIG. 4 is a vertical cross-sectional view illustrating a pressure boundary heat exchanger of the passive containment air cooling device with the isolated pressure boundary according to the embodiment of the present invention.

FIG. 5 is a horizontal cross-sectional view illustrating a passive containment air cooling system with an isolated pressure boundary formed on a quadrant according to the embodiment of the present invention.

FIG. 6 is a vertical cross-sectional view illustrating the case where a portion of an external heat exchanger of the passive containment air cooling system with the isolated pressure boundary according to the embodiment of the present invention is broken.

FIG. 7 is a vertical cross-sectional view illustrating the case where a portion of an internal heat exchanger of the passive containment air cooling system with the isolated pressure boundary according to the embodiment of the present invention is broken.

DESCRIPTION OF THE PREFERRED EMBODIMENTS

Hereinafter, a passive containment air cooling device and system with an isolated pressure boundary according to the present invention will be described in detail with reference to the accompanying drawings. In this case, constitutions and functions of the present invention illustrated in the drawings and described with reference to the drawings are illustrated as at least one embodiment, and the technical spirit, and the essential constitution and function of the present invention are not limited thereto.

Extensively used general terms at this time are selected as terms used in the present invention in consideration of a function thereof in the present invention, but the terms may be changed according to an intention of a person with ordinary skill in the art, the custom, or the emergence of a novel technology. Further, in a special case, terms arbitrarily selected by an applicant may be used, and in this case, the meaning of the terms will be described in detail in the corresponding description of the invention. Accordingly, it should be noted that the terms used in the present invention are not simple names of the terms, but should be defined based on the meaning of the terms and entire contents of the present invention.

FIG. 3 is a vertical cross-sectional view of a passive containment air cooling device with an isolated pressure boundary according to an embodiment of the present invention.

Referring to FIG. 3, the passive containment air cooling device with the isolated pressure boundary according to the embodiment of the present invention may include a heat exchanger 300, an air induction duct 400, and a cooled air exhaust unit 500.

The heat exchanger 300 may be formed through an outer wall of a containment 100, and may be exposed to the inside and outside of the containment 100. The heat exchanger 300 may be configured with a closed loop. The heat exchanger 300 exposed to the inside of the containment 100 absorbs vapor heat in the containment 100 to cool high-temperature vapor in the containment. In this case, a liquid coolant in the heat exchanger is vaporized to flow toward the heat exchanger 300 outside the containment 100. The coolant may be made of a material having high specific heat, and may be preferably water. The heat exchanger 300 exposed to the outside of the containment 100 emits heat absorbed inside the containment 100 to air outside the containment 100. In this case, the heat exchanger outside the containment 100 is cooled by ambient air to condense high-temperature vapor in the heat exchanger into a liquid phase and thus allow the liquid phase to flow from the heat exchanger outside the containment 100 to the heat exchanger inside the containment 100 due to a head difference, thereby forming a closed loop natural circulation. For the heat exchanger 300, the heat exchanger 300 exposed to the outside of the containment 100 may be cooled by the air induction duct 400 and the cooled air exhaust unit 500 which will be described later. The coolant may fill the heat exchanger 300 in a content of 30 to 70% of an internal volume of the heat exchanger 300, but the volume is not limited thereto. When the content of the coolant is greater than 70% of the internal volume of the heat exchanger 300, internal pressure of the heat exchanger 300 may be excessively increased due to vaporization of the coolant; and when the content of the coolant is less than 30% of the internal volume of the heat exchanger 300, cooling efficiency of a cooling system of the containment may be reduced.

The heat exchanger 300 will be described later with reference to FIG. 4.

The air induction duct 400 is a passage pipe formed outside the containment 100 to induce a flow of air, and external air may flow through an inlet and be exhausted through an outlet. The air induction duct 400 may be formed outside the heat exchanger 300. The air induction duct 400 is a hollow pipe vertically formed outside the containment 100, and may have a shape corresponding to that of the outer wall of the containment 100. Due to the aforementioned constitution, a temperature of relatively cold air flowing through the inlet of the air induction duct 400 may be increased due to heat of the heat exchanger 300, and for the flow of air in the air induction duct 400, a density difference serving as driving force of the flow of air may be naturally formed due to heat of the heat exchanger 300. Air in the air induction duct 400 may have a stack effect. Further, the vaporized coolant positioned in the heat exchanger 300 may be cooled due to the flow of air and then liquefied.

The cooled air exhaust unit 500 may include an electromotive fan 510 and a driver 550. The cooled air exhaust unit 500 may be provided in the air induction duct 400, and increase an amount of the flow of air naturally formed in the air induction duct 400. As the amount of the flow of air in the air induction duct 400 is increased due to the cooled air exhaust unit 500, cooling efficiency of the coolant positioned in the heat exchanger 300 may be increased. The electromotive fan 510 is a fan rotating by the driver 550, and may be a device forming the flow of air. The driver 550 is a power device performing a rotation motion and may be a motor, but is not limited thereto.

FIG. 4 is a vertical cross-sectional view of the heat exchanger of the passive containment air cooling device with the isolated pressure boundary according to the embodiment of the present invention.

Referring to FIG. 4, the heat exchanger 300 may include a containment internal heat exchanger 310, a containment external heat exchanger 320, a gas phase (vapor) connection pipe 330, and a liquid phase (water) connection pipe 340.

The containment internal heat exchanger 310, which is a pipe positioned in the containment and of which at least a portion is formed perpendicular to a ground surface, may receive internal heat of the containment. Cooling water included in the containment internal heat exchanger 310 may absorb the internal heat of the containment to be vaporized, and in this case, vapor of vaporized cooling water may be positioned at an upper part of the containment internal heat exchanger 310. Further, the containment internal heat exchanger 310 may have a heat exchanger tube assembly structure capable of enduring the internal pressure of the containment. If the containment internal heat exchanger 310 is not formed to have the heat exchanger tube assembly structure, the containment internal heat exchanger 310 may be broken due to internal pressure of the containment or pressure of the vaporized coolant in the containment internal heat exchanger 310. Thus, it is desirable that the containment internal heat exchanger 310 be formed to have the heat exchanger tube assembly structure made of metal having high thermal conductivity to facilitate heat exchange, but the containment internal heat exchanger 310 is not limited thereto.

The containment external heat exchanger 320, which is a pipe positioned outside the containment and of which at least a portion is formed perpendicular to the ground surface, may emit heat of vapor of the cooling water circulated through the gas phase (vapor) connection pipe 330 in the containment internal heat exchanger 310 to the outside.

Vapor of the cooling water, from which heat is emitted, may be cooled in the containment external heat exchanger 320, and the vapor may be liquefied to be accumulated at a lower part of the containment external heat exchanger 320. Further, the containment external heat exchanger 320 has the heat exchanger tube assembly structure capable of enduring a pressure. If the containment external heat exchanger 320 is not a heat exchanger tube capable of enduring a pressure, the containment external heat exchanger 320 may be broken due to pressure of vapor of cooling water flowing from the containment internal heat exchanger 310. Thus, it is preferable that the containment external heat exchanger 320 be formed to have the heat exchanger tube assembly structure. Further, it is preferable that the containment external heat exchanger 320 be a heat exchanger tube made of metal having high thermal conductivity in order to facilitate heat exchange, but the containment external heat exchanger is not limited thereto.

The gas phase (vapor) connection pipe 330 is a pipe connecting an end of an upper part of the containment internal heat exchanger 310 and an end of an upper part of the containment external heat exchanger 320, and a flow path of a gas phase (vapor) coolant. The liquid phase (water) connection pipe 340 is a pipe connecting an end of a lower part of the containment internal heat exchanger 310 and an end of a lower part of the containment external heat exchanger 320, and may be a flow path of a liquid phase (water) coolant. The gas phase (vapor) connection pipe 330 and the liquid phase (water) connection pipe 340 may be elements which penetrate through the outer wall of the containment to slantly connect a containment internal element and a containment external element such that a natural circulation is achieved between the containment internal element and the containment external element.

The gas phase (vapor) connection pipe 330 is inclined so that a direction of the containment external heat exchanger 320 is higher than a direction of the containment internal heat exchanger 310, and a slope may be (+)5° or more. Vapor of cooling water generated in the containment internal heat exchanger 310 may flow into the containment external heat exchanger 320 due to the slope, and flowing may be performed in a natural circulation manner without a separate controlling device due to the rising effect of high-temperature gas. In this case, when the slope of the gas phase (vapor) connection pipe 330 is less than (+)5°, vapor of cooling water may not flow smoothly.

The liquid phase (water) connection pipe 340 is inclined so that the direction of the containment internal heat exchanger 310 is higher than the direction of the containment external heat exchanger 320, and the slope may be (−)5° or less. When the slope of the liquid phase (water) connection pipe 340 is greater than (−)5°, the sufficient slope is not obtained, and thus condensed cooling water may not flow smoothly.

Cooling water condensed in the containment external heat exchanger 320 may flow into the containment internal heat exchanger 310 due to the slope, and flowing may be performed in a natural circulation manner due to a head difference caused by a difference in density between cooling water and vapor. Cooling water accumulated in the containment external heat exchanger 320 may flow into the containment internal heat exchanger 310 due to a difference between the head of the coolant in the containment internal heat exchanger 310 and the head of the coolant in the containment external heat exchanger 320, and resultantly the coolant may be circulated. By virtue of the aforementioned constitution of the containment heat exchanger 300, the coolant in the containment heat exchanger 300 may be vaporized in the containment internal heat exchanger 310 positioned in the containment due to the internal heat of the containment, and the vapor of the coolant flow into the containment external heat exchanger 320 through the gas phase (vapor) connection pipe 330. Then, the vapor of the coolant may be condensed, and be naturally re-circulated through the liquid phase (water) connection pipe 340 to the lower part of the containment internal heat exchanger 310.

The gas phase (vapor) connection pipe 330 and the liquid phase (water) connection pipe 340 may be preferably configured with pressure pipes, but are not limited thereto.

The containment internal heat exchanger 310, the containment external heat exchanger 320, the gas phase (vapor) connection pipe 330, and the liquid phase (water) connection pipe 340 constitute the closed loop to independently form an internal pressure. Accordingly, the closed loop forms a pressure boundary to internal pressure of the containment inside the containment, and also forms a pressure boundary to an atmospheric pressure outside the containment. Accordingly, even when the closed loop is broken inside or outside the containment, a radioactive substance in the containment may be prevented from being leaked to the atmosphere outside the containment. A description thereof will be described in more detail with reference to FIGS. 6 and 7.

FIG. 5 is a horizontal cross-sectional view illustrating a passive containment air cooling system with an isolated pressure boundary formed on a quadrant according to the embodiment of the present invention.

The passive containment air cooling system with the isolated pressure boundary according to the embodiment of the present invention may include at least two heat exchanging units 600. Preferably, the passive containment air cooling system may include the heat exchanging unit 600 formed on each quadrant of the containment 100, but is not limited thereto. If one heat exchanging unit 600 is provided in the containment 100, the containment 100 is unable to be cooled when the heat exchanging unit 600 is broken. Thus, when the plurality of heat exchanging units 600 are provided, it is possible to prepare for the case some of the heat exchanging units 600 are disabled.

FIGS. 6 and 7 are vertical cross-sectional views illustrating the case where an external portion or an internal portion of a heat exchanger of the passive containment air cooling system with the isolated pressure boundary according to the embodiment of the present invention is broken.

Referring to FIG. 6, the case where the containment external heat exchanger 320 of the heat exchanger 300 is broken (A) may occur. In this case, the heat exchanger 300 has a closed loop shape, and thus the radioactive substance generated in the containment 100 does not flow into the heat exchanger 300, and may be prevented from being leaked to the outside of the containment.

Referring to FIG. 7, the case where the containment internal heat exchanger 310 of the closed loop is broken (B) may occur. In this case, the radioactive substance generated in the containment may flow into the closed loop, but the pressure boundary of the containment external heat exchanger 320 is blocked from the atmosphere, and thus the radioactive substance in the containment may be prevented from being leaked to the atmosphere.

According to embodiments of the present invention, it is possible to cool a containment through a cooling pipe of a closed loop, and prevent a radioactive substance in the containment from being leaked to the external atmosphere because a pressure boundary between the internal pressure of the containment and the external atmosphere is preserved even though the cooling pipe is partially broken.

Since a heat exchanger outside the containment can be an air cooling type, an additional supplement of cooling water is not required. Furthermore, the cooling pipe of the closed loop is driven through natural circulation, and thus driving and operation controlling devices are not required separately, thereby reducing equipment maintenance costs for a containment cooling system.

According to the aforementioned constitution, in the passive containment air cooling device and system with the isolated pressure boundary according to the present invention, a related art water cooling type of containment cooling system continuously requiring a supplement of cooling water can be replaced by an air cooling type of passive containment air cooling device with the isolated pressure boundary which does not require a supplement of cooling water, and thus a high effect is obtained even with simple equipment.

Further, the passive containment air cooling device and system with the isolated pressure boundary according to the present invention can prevent a radioactive substance in a containment from being leaked to the outside through a cooling pipe of a closed loop when a heat exchanger is partially broken.

Moreover, in the passive containment air cooling device and system with the isolated pressure boundary according to the present invention, since a coolant in the heat exchanger is naturally circulated due to internal heat of the containment, a separate controlling device circulating the coolant is not required, thereby reducing costs.

What is claimed is:

1. A passive containment air cooling device with an isolated pressure boundary, comprising:
   a plurality of heat exchangers positioned inside and outside a containment, penetrating through an outer wall of the containment to be connected to the containment through a pipe and thus form a closed loop, and including a coolant;
   a plurality of air induction ducts circulating air outside the plurality of heat exchangers; and a cooled air exhaust unit formed in at least one of the plurality of air induction ducts to increase cooling efficiency of the plurality of heat exchangers,
   wherein each quadrant of an outer part of the containment is provided with one of the plurality of heat exchangers and one of the plurality of air induction ducts and the plurality of air induction ducts are converged into one in an upper part of the containment and have a single air outlet.

2. The device as set forth in claim 1, wherein the heat exchanger comprises: a containment internal heat exchanger exposed to an inside of the containment; a containment external heat exchanger exposed to an outside of the containment; a gas phase connection pipe penetrating through the outer wall of the containment and connecting a side of an upper part of the containment internal heat exchanger and a side of an upper part of the containment external heat exchanger; and a liquid phase connection pipe penetrating through the outer wall of the containment and connecting a side of a lower part of the containment internal heat exchanger and a side of a lower part of the containment external heat exchanger.

3. The device as set forth in claim 2, wherein the containment internal heat exchanger, the containment external heat exchanger, the gas phase connection pipe, and the liquid phase connection pipe constitute a closed loop.

4. The device as set forth in claim 2, wherein the containment internal heat exchanger and the containment external heat exchanger have a heat exchanger tube assembly structure enduring internal and external pressures of the containment.

5. The device as set forth in claim 2, wherein the gas phase connection pipe is inclined at a slope of 5° or more to a ground surface from the inside of the containment to the outside, and the liquid phase connection pipe is inclined at a slope of −5° or less to the ground surface from the outside of the containment to the inside.

6. The device as set forth in claim 2, wherein the containment internal heat exchanger vaporizes a coolant in the containment internal heat exchanger due to internal heat of the containment.

7. The device as set forth in claim 2, wherein the containment external heat exchanger emits heat to external air to condense a coolant in the containment external heat exchanger.

8. The device as set forth in claim 1, wherein the cooled air exhaust unit is selectively provided on any one of upper, lower, and middle portions inside the air induction duct.

* * * * *